US008230594B1

(12) United States Patent
Bossard et al.

(10) Patent No.: US 8,230,594 B1
(45) Date of Patent: Jul. 31, 2012

(54) SYSTEM AND METHOD FOR WELDING SMALL DIAMETER TUBES INTO A HIGH-DENSITY MATRIX

(76) Inventors: Peter R. Bossard, Ivyland, PA (US); James Loomis, Warrington, PA (US)

( * ) Notice: Subject to any disclaimer, the term of this patent is extended or adjusted under 35 U.S.C. 154(b) by 403 days.

(21) Appl. No.: 12/463,381

(22) Filed: May 9, 2009

(51) Int. Cl.
*B21D 39/06* (2006.01)
*B21D 53/06* (2006.01)
*B23K 31/00* (2006.01)
*B23Q 17/00* (2006.01)
*B23K 26/02* (2006.01)

(52) U.S. Cl. ............... 29/890.043; 29/890.054; 29/406; 29/407.09; 29/407.05; 29/525.14; 219/121.6; 219/121.63; 219/121.64; 219/121.78; 219/121.83

(58) Field of Classification Search ................. None
See application file for complete search history.

(56) References Cited

U.S. PATENT DOCUMENTS

| | | | | |
|---|---|---|---|---|
| 3,052,452 A * | 9/1962 | Taga | ........................ | 285/122.1 |
| 3,078,551 A * | 2/1963 | Patriarca et al. | ......... | 29/890.043 |
| 3,465,727 A * | 9/1969 | Tidball | ........................ | 122/32 |
| 4,125,280 A * | 11/1978 | Kuzel | ........................ | 285/124.3 |
| 4,343,636 A * | 8/1982 | Bhatti | ........................ | 65/492 |
| 5,407,004 A * | 4/1995 | DeRisi et al. | .................. | 165/153 |
| 5,997,463 A | 12/1999 | Cutrer | ........................ | 600/8 |
| 6,314,631 B1 * | 11/2001 | Pryor | ........................ | 29/407.04 |
| 7,367,387 B2 * | 5/2008 | Brunner et al. | ................ | 165/173 |
| 7,883,670 B2 * | 2/2011 | Tonkovich et al. | ............ | 422/129 |
| 2001/0023536 A1 * | 9/2001 | Lambert et al. | ........... | 29/890.043 |
| 2002/0015654 A1 * | 2/2002 | Das et al. | ......................... | 419/8 |
| 2002/0088778 A1 * | 7/2002 | Chang | ........................ | 219/121.63 |
| 2002/0139781 A1 * | 10/2002 | Milewski et al. | .......... | 219/121.6 |
| 2002/0162648 A1 * | 11/2002 | Crook | ........................ | 165/153 |
| 2004/0064946 A1 * | 4/2004 | Smith et al. | ............. | 29/890.043 |
| 2005/0051314 A1 * | 3/2005 | Heier | ........................ | 165/173 |
| 2005/0178751 A1 * | 8/2005 | Adelmann et al. | ........ | 219/121.64 |
| 2006/0011592 A1 * | 1/2006 | Wang et al. | .............. | 219/121.64 |
| 2006/0081570 A1 * | 4/2006 | Schildgen | ................ | 219/121.64 |
| 2006/0150388 A1 * | 7/2006 | Inada et al. | ...................... | 29/516 |
| 2006/0242831 A1 * | 11/2006 | Cesaroni | .................. | 29/890.054 |
| 2007/0075054 A1 * | 4/2007 | Nakamura | ............... | 219/121.61 |
| 2007/0114268 A1 * | 5/2007 | Ishii et al. | ...................... | 228/183 |
| 2007/0278097 A1 * | 12/2007 | Bhullar et al. | ........... | 204/403.01 |
| 2008/0000625 A1 * | 1/2008 | Baylis et al. | .................. | 165/173 |
| 2008/0023453 A1 * | 1/2008 | Zhang | ........................ | 219/121.64 |
| 2008/0277105 A1 * | 11/2008 | Geskes | ......................... | 165/162 |
| 2009/0134235 A1 * | 5/2009 | Ivri | ................................... | 239/4 |
| 2009/0139703 A1 * | 6/2009 | Vet et al. | ........................ | 165/173 |
| 2009/0145888 A1 * | 6/2009 | Hesse et al. | ............... | 219/121.64 |
| 2009/0280349 A1 * | 11/2009 | Bittendorfer et al. | .......... | 428/594 |
| 2009/0308850 A1 * | 12/2009 | Hill | ........................... | 219/121.64 |
| 2010/0068132 A1 * | 3/2010 | Vencill et al. | .............. | 423/648.1 |
| 2010/0229616 A1 * | 9/2010 | Fink et al. | ........................ | 72/338 |
| 2010/0282722 A1 * | 11/2010 | Ramsayer et al. | ........ | 219/121.64 |
| 2010/0289300 A1 * | 11/2010 | Kokubo | ........................ | 296/205 |
| 2010/0320177 A1 * | 12/2010 | Ramsayer | ................. | 219/121.67 |
| 2011/0183152 A1 * | 7/2011 | Lanham et al. | ............... | 428/597 |

* cited by examiner

*Primary Examiner* — Duane Smith
*Assistant Examiner* — Pankti Patel
(74) *Attorney, Agent, or Firm* — LaMorte & Associates, P.C.

(57) ABSTRACT

A tube matrix and the corresponding method of joining a plurality of tubes to a base plate to create the tube matrix. The tube matrix has a base plate from which a plurality of parallel tubes extend. The base plate has holes formed though it to receive the tubes. The tubes are placed into the holes on the base plate. The tubes may have end flares that abut against the base plate and prevent the tubes from completely passing through the base plate. Once the tubes are in place in the holes of the base plate, the tubes and base plate are welded together with individual laser welds. The laser welds enable a very dense matrix of tubes to be welded to the base plate without damaging or obstructing the tubes.

10 Claims, 5 Drawing Sheets

SYSTEM AND METHOD FOR WELDING SMALL DIAMETER TUBES INTO A HIGH-DENSITY MATRIX

BACKGROUND OF THE INVENTION

1. Field of the Invention

In general, the present invention relates to methods and procedures used to manufacture a matrix of parallel tubes. More particularly, the present invention relates to methods and procedures where multiple parallel tubes are welded to a common base.

2. Prior Art Description

Matrices of parallel tubes are used in many different pieces of equipment. For instance, many heat exchangers use parallel tubes. One of the more exotic uses of a matrix of parallel tubes can be found in hydrogen gas processing cells.

In hydrogen gas processing cells, such as hydrogen purifiers, hydrogen separators, and membrane reactors, tubes of palladium alloy are exposed to gases that contain hydrogen. The palladium alloy is readily permeable to hydrogen at high temperatures. Accordingly, the hydrogen passes through the walls of the tubes and becomes separated from the other gases. An example of hydrogen processing equipment that utilizes a matrix of parallel tubes can be found in co-pending patent application Ser. No. 12/053,528, entitled Hydrogen Gas Separator System Having Micro-Channel Construction For Efficiently Separating Hydrogen Gas From A Mixed Gas Source.

For many reasons, it is desirable to use very small diameter tubes in hydrogen gas processing cells. It is also desirable to place the tubes as close together as possible without touching. In order to hold the tubes firmly in the desired matrix orientation, the various tubes are typically set into a common metal base. In the prior art, holes are drilled into a base. The tubes are then placed into the holes and are brazed into place.

In certain hydrogen gas processing cell applications, hundreds of tubes are set into a single base. The tubes are packed very densely with only a fraction of a millimeter between adjacent tubes. Traditional welding techniques cannot be used because of the minute areas being welded and the lack of available space around each weld. Accordingly, heat brazing techniques are applied.

In a hydrogen gas processing cell, tubes of palladium alloy are brazed to stainless steel end caps. The palladium tubes are then tested for leaks and otherwise conditioned for commercial use. It is only after a palladium tube has been quality tested that it is added to a matrix of tubes. This ensures that the matrix of tubes will not contain any one defective tube that would render the whole matrix defective.

Once tested tubes are added to a matrix, the tested tubes traditionally undergo a second brazing procedure that connects the tubes to the matrix. During the second brazing procedure, the integrity of the pre-tested tubes may be comprised by thermal stresses. Furthermore, during the second brazing process, the initial brazed connections may become undone and create leaks. Additionally, when traditional brazing techniques are used on large matrices of tubes, it has proven difficult to create consistent brazed seals around all of the tubes. Often, some tubes have proper brazed seals, others do not. Since many hundreds of tubes may be present in a single matrix, even a brazing technique with 99.9% effectiveness will result in every hydrogen gas processing cell being defective because of at least one leaking brazed seal.

A need therefore exists for an improved technique for joining hundreds of small diameter tubes in parallel to a common base in a dense matrix. A need also exists for an improved joining process that does not thermally shock the tubes or otherwise compromise the quality of the tubes. These needs are met by the present invention as described and claimed below.

SUMMARY OF THE INVENTION

The present invention is a tube matrix and the corresponding method of joining a plurality of tubes to a base plate to create the tube matrix. The tube matrix has a base plate from which a plurality of parallel tubes extend. The base plate has holes formed though it to receive the tubes. The tubes are placed into the holes on the base plate. The tubes may have end flares that abut against the base plate and prevent the tubes from completely passing through the base plate. Once the tubes are in place in the holes of the base plate, the tubes and base plate are welded together with individual laser welds. The laser welds enable a very dense matrix of tubes to be welded to the base plate without damaging or obstructing the tubes. The result is a matrix of tubes that may contain many hundreds of tubes, wherein each fully test tube is individually welded in place with an equally high quality weld.

The welding process is semi-automated, wherein the position of each weld is calculated from a camera image of the tube being welded. The result is a quality weld regardless of positional anomalies that occur from piece to piece.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The methodology of the present invention can be used to create a matrix from tubes of many different materials, such as stainless steel, palladium alloys and the like. The tube material selected depends upon the intended use of the tube matrix. The present invention is especially useful in making a matrix of tubes for use in a hydrogen gas processor. Some models of hydrogen processor cells use both a matrix of stainless steel tubes and a matrix of palladium alloy tubes. Both tube matrices can be made using the methodology described below.

Figure 1:
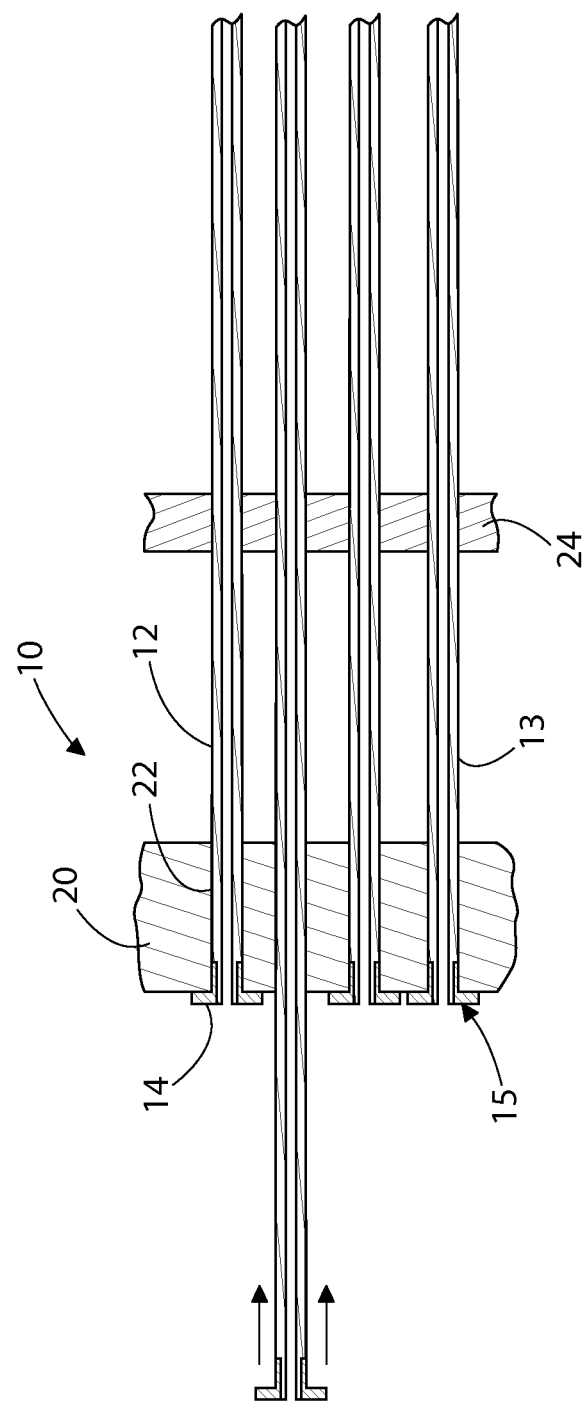
FIG. 1 is a fragmented cross-sectional view of a segment of a tube matrix.

Referring to FIG. 1, a segment of a tube matrix 10 is shown. The tube matrix 10 contains a plurality of palladium alloy tube assemblies 12. Each palladium alloy tube assembly 12 contains a tube 13 of a palladium alloy. An end termination 15 is connected to one end of the tube 13. The end termination 15 is short tube segment 17 of stainless steel that receives the end of the tube 13. A flare 14 is formed around the end termination 15. The flare 14 has a diameter that is between 25% and 100% larger than the outside diameter of the palladium alloy tube 13.

The end termination 15 is brazed to the tube 13 in a separate procedure, therein forming a palladium tube assembly 12. After the end termination 15 is brazed to the tube 13, the resulting palladium alloy tube assembly 12 is quality tested. If a palladium alloy tube assembly 12 passes quality testing, then it is known that the braze between the end termination 15 and the tube 13 is proper. It is further known that the palladium alloy tube 13 itself is not cracked, ruptured, or otherwise defective.

In FIG. 1, a segment of a base plate 20 is shown. The base plate 20 is metal and is preferably a stainless steel or high nickel alloy. Holes 22 are drilled through the base plate 20 in a desired matrix pattern. Each hole 22 has an inside diameter which is only slightly larger than the outside diameter of the palladium alloy tube assemblies 12. Accordingly, the palladium alloy tube assemblies 12 can pass into the holes 22 and have little lateral play once in the holes 22. The holes 22 are smaller than the flares 14 on the palladium alloy tube assemblies 12. Accordingly, the palladium alloy tube assemblies 12 can be advanced into the holes 22 until the flares 14 abut against the base plate 20.

The distance between the centers of any two adjacent holes 22 is only slightly larger than the diameter of the tube flare 14. In real applications, palladium alloy tube assemblies 12 are placed in a matrix at a density of between three tubes and fifty tubes per square centimeter of a base plate. By spacing the holes 12 at distances only slightly larger than the flares 14, the tubes 12 are packed at their densest possible configuration when the palladium alloy tube assemblies 12 are inserted into the holes 22.

An optional guide plate 24 may be provided. The guide plate 24 has holes 26 formed through it with exacting tolerances. The hole pattern on the guide plate 24 is the same as the hole pattern on the base plate 20. The palladium alloy tubes assemblies 12 pass through both the base plate 20 and the guide plate 24. The guide plate 24 helps hold the various palladium alloy tube assemblies 12 straight and parallel until the palladium alloy tube assemblies 12 are welded to the base plate 20. After the palladium alloy tube assemblies 12 are welded to the base plate 20, the position of the palladium alloy tube assemblies 12 becomes fixed and the guide plate 24 can be removed.

Figure 2:
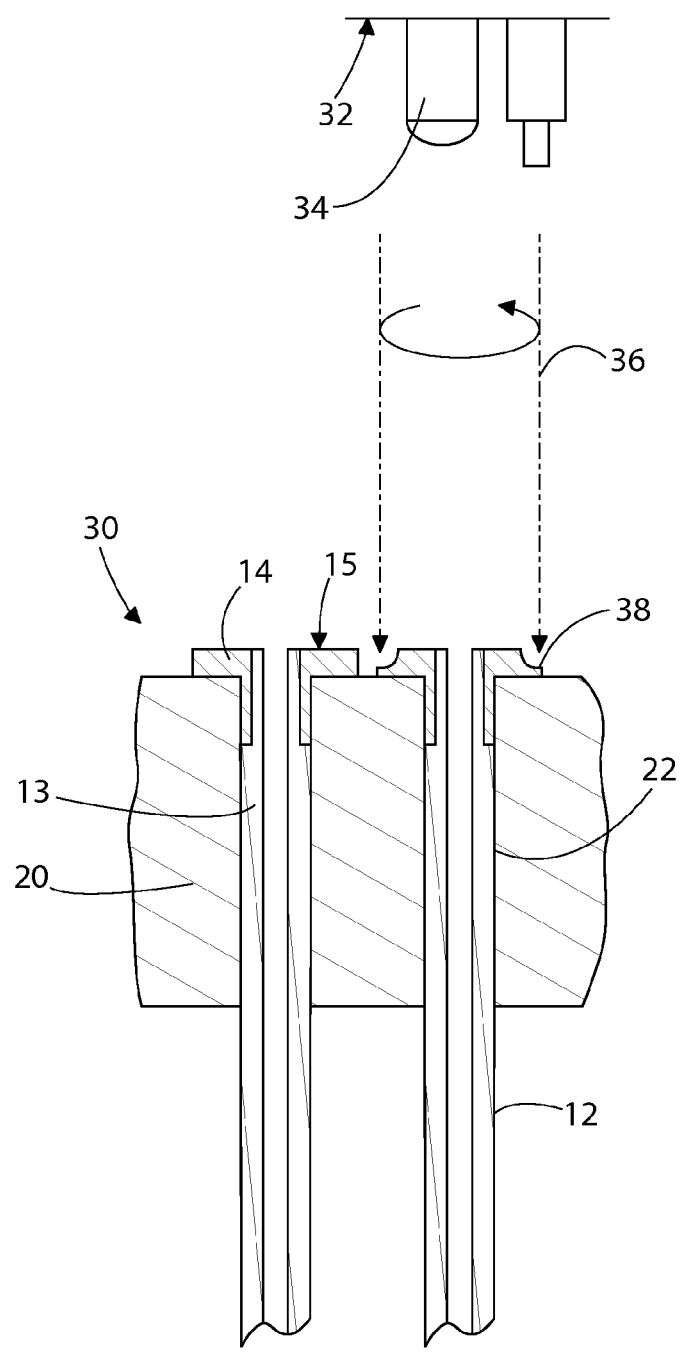
FIG. 2 is a schematic showing a segment of a tube matrix in a laser welding machine.

Referring to FIG. 2 in conjunction with FIG. 1, it can be seen that once all of the palladium alloy tube assemblies 12 are inserted into the base plate 20, a loose assemblage 30 is produced. The loose assemblage 30 is placed inside a computer controlled laser welding machine 32. The laser welding machine 32 has targeting optics 34 that are used to aim a laser beam 36, as will be further described. The laser welding machine 32 moves the laser beam 36 around the periphery of each flare 14. The laser beam 36 is kept perpendicular to the base plate 20. The laser beam 36 is moved in a circular motion at the appropriate linear velocity and focal distance to produce a uniform and leak tight weld between the flare 14 and the base plate 20. Furthermore, the laser beam 36 is focused to an appropriate spot diameter for the weld penetration desired between the flare 14 and the base plate 20. The laser beam 36 melts the material of the flare 14 around its periphery as well as the surface of the base plate 20. This creates a weld 38 that extends about the periphery of the flare 14 and has an appropriate amount of weld penetration. Due to the nature of the laser welding machine 32, the weld 38 is created rapidly using minimal energy by using the laser energy in a highly efficient manner which prevents the overall base plate 20 from becoming excessively hot. Accordingly, the braze that joins the end termination 15 to the palladium alloy tube 13 does not melt and is kept intact. Furthermore, the thermal shock to the palladium alloy tube 13 at the center of the palladium alloy tube assembly 12 is minimal. As a consequence, palladium alloy tube assemblies 12 that have been quality tested as "good" can be consistently maintained in that condition throughout the laser welding process.

Once the full periphery of a flare 14 is subjected to the laser beam 36, a complete weld 38 is formed. The weld 38 anchors the palladium alloy tube assembly 12 to the base plate 20, therein allowing for the removal of the guide plate 24 that may have been used. Depending upon the size of the flare 14, a palladium alloy tube assembly 12 can be welded into place in only a few seconds. A full matrix of many hundreds of palladium alloy tube assemblies 12 can, therefore, be manufactured in a short time frame by a single laser without manual intervention.

In the exemplary embodiment illustrated, a single laser beam 36 is used to produce all the needed welds. It will be understood that the speed of the welding operation can be accelerated by providing a laser welding machine with multiple lasers. In this manner, multiple welds can be produces simultaneously.

It will be understood that due to manufacturing tolerances in the drilling of holes 22 in the base plate 20, the formation of the palladium alloy tube assemblies 12, and the placement of both elements into the laser welding machine 32, the areas that must be welded by the laser welding machine 32 will vary from piece to piece. In order to ensure accuracy of the welds 38, each weld 38 is actively targeted with optical recognition system before the weld is made.

Figure 3:
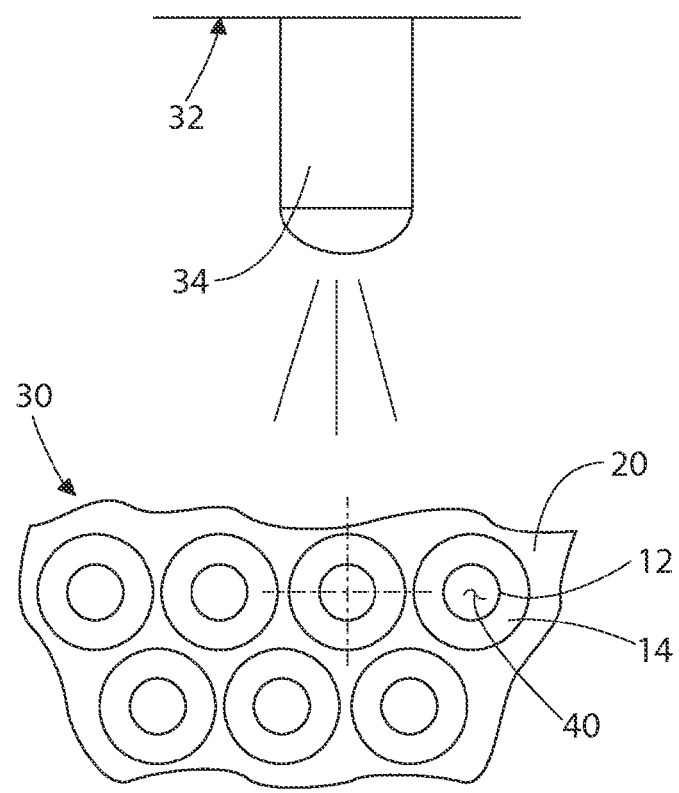
FIG. 3 is a schematic showing a segment of a tube matrix being targeted by a laser welding machine.

Referring to FIG. 3, it can be seen that the laser welding machine 32 has targeting optics 34. The targeting optics 34 are positioned above the loose assemblage 30 of palladium alloy tube assemblies 12 in the base plate 20. The base plate 20 is metal and is fairly reflective. Likewise, the flares 14 are metal and are fairly reflective. What are not reflective on the loose assembly 30 are the tube conduits 40 that descend down the center of the palladium alloy tube assemblies 12. The tube conduits 40, therefore, appear as dark circles to the targeting optics 34. Imaging software is used to locate the center of each tube conduit 40. Once the center of a tube conduit 40 is located, the laser welding machine 32 is instructed to move the laser beam 36 in a predetermined pattern relative to that identified center point.

Figure 4:
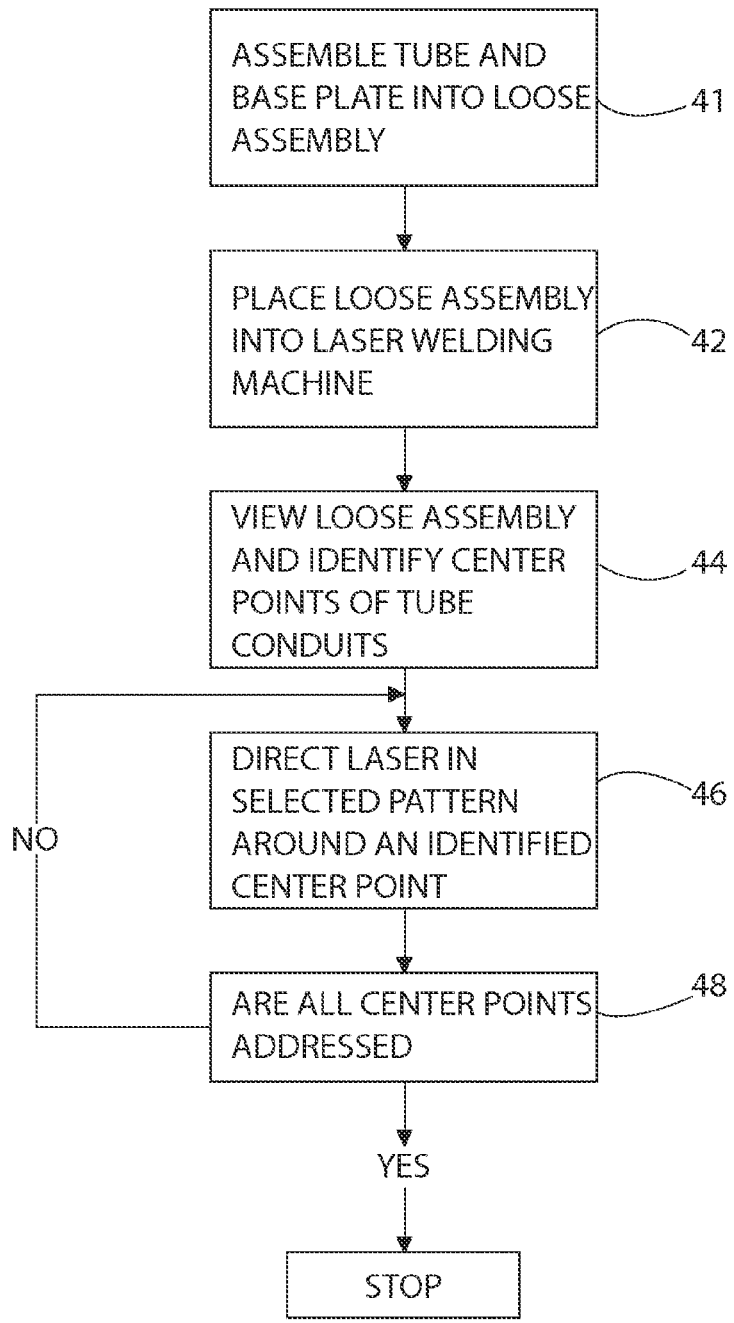
FIG. 4 is a block diagram showing the method of operation used by a laser welding machine during the manufacture of a tube matrix.

Referring to FIG. 4 in conjunction with FIG. 3, the operation of the operational software used by the laser welding machine 32 is described. As is indicated by Blocks 41 and 42, the loose assemblage 30 of the palladium alloy tube assemblies 12 and the base plate 20 are placed into the laser welding machine 32. The targeting optics 34 and operational software identify the center point of the tube conduits 40 in the viewed image. See Block 44. Knowing the diameter of the flares 14, the laser welding machine 32 is directed to direct the laser beam 36 in a circular pattern around each identified tube conduit 40. See Block 46. The circular pattern of the laser beam 36 has the same diameter as the periphery of the flare 14. Consequently, the entire periphery of the flare 14 becomes welded to the base plate 20. Once the full circular pattern is welded, the laser beam 36 is directed to another of the identified tube conduits 40. See Block 48. This cycle is repeated until all of the flares 14 have been welded. See Block 50.

In the embodiment of FIG. 1, FIG. 2, and FIG. 3 a plurality of palladium alloy tube assemblies 12 are shown being affixed to a base plate 20. However, as has been previously stated, certain hydrogen gas processing cells also contain a matrix of stainless steel tubes or even Hastelloy®. Such tubes are often used to either externally surround similar tubes of smaller diameter or internally supported palladium alloy tubes.

Figure 5:
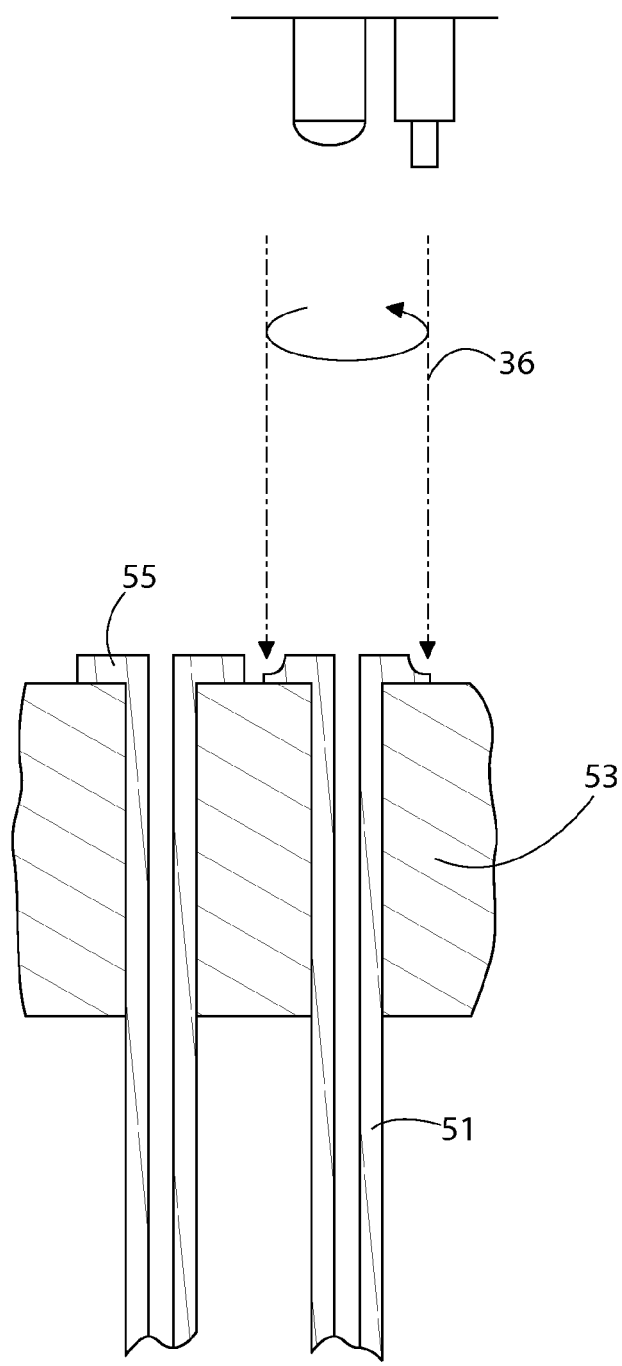
FIG. 5 is a schematic showing an alternate embodiment of a tube matrix in a laser welding machine.

Referring to FIG. 5, a segment of a matrix is shown where tubes 51 of stainless steel or Hastelloy® are welded directly to a base plate 53. In this embodiment, flares 55 can be formed directly onto the end of each tube 51 using tradition flaring techniques. The flares 55 are then laser welded to the base plate 53 in the same manner as has been previously described.

It will be understood that the embodiment of the present invention that is illustrated and described is merely exemplary and that a person skilled in the art can make many variations to that embodiment. For example, any desired distance can be made between tubes, rather than the maximum density embodiment shown. Furthermore, the diameter of the tubes and of the tube flares can be varied within functional limitations. Likewise, tubes and flares with shapes other than round can be used. For example a square tube with a square flare can be used. All such variations, modifications and alternate embodiments are intended to be included within the scope of the present invention as defined by the claims.

What is claimed is:

1. A method of joining a plurality of tubes to a base plate to form a dense matrix of parallel tubes for use in a hydrogen gas processing cell, said method comprising the steps of:
   providing a base plate having a plurality of holes formed therethough;
   providing a plurality of tubes, each tube being fabricated from a palladium alloy, wherein each of said tubes defines a central conduit and has flange at one end;
   providing a laser welder;
   providing an automated imaging system for controlling said laser welder;
   inserting said tubes into said holes on said base plate so that each said flange abuts against said base plate;
   locating said central conduit of each of said tubes utilizing said automated imaging system; and
   directing said laser welder to weld in a circular pattern a predetermined distance around each said central conduit, therein laser welding each said flange to said base plate.

2. The method according to claim 1, wherein said step of providing a base plate includes providing a base plate with a plurality of holes at least as dense as three holes per square centimeter.

3. The method according to claim 1, wherein each said flange has a peripheral edge and wherein laser welder welds each said flange to said base proximate said peripheral edge.

4. A method of forming a matrix of tubes, comprising the steps of:
   providing a base plate having a plurality of holes formed therethough, wherein each of said holes is formed in said base plate at a density of least as great as three hole per square centimeter;
   providing a plurality of tubes through said holes in said base plate, wherein said tubes are fabricated, at least in part from a palladium alloy and wherein each of said tubes defines a central conduit;
   providing a laser welder;
   providing an imaging system for controlling said laser welder;
   inserting said plurality of tubes into said plurality of holes;
   locating said central conduit of each of said plurality of tubes utilizing said imaging system; and
   directing said laser welder to weld in a circular pattern a predetermined distance around each said central conduit, therein welding each of said plurality of tubes to said base plate around each of said plurality of said holes.

5. The method according to claim 4, wherein each of said tubes extends in parallel from said base plate.

6. The method according to claim 4, wherein each of said tubes has a flange that abuts said base plate.

7. The method according to claim 6, wherein each said flange has a circular peripheral edge.

8. The method according to claim 7, wherein said laser welder creates a weld that extends around said peripheral edge of each said flange.

9. A method of joining a plurality of tubes to a base plate, comprising the steps of:
   providing a base plate having a plurality of parallel holes formed therethough at a density of at least three holes per square centimeter;
   providing a plurality of tubes comprised of a palladium alloy, wherein each of said tubes defines a conduit and has a flare of a predetermined diameter at one end;
   providing a laser welder;
   providing an imaging system for controlling said laser welder;
   inserting said tubes into said holes on said base plate so that each of said tubes extends from said base plate in parallel and each said flare contacts said base plate;
   locating said central point within each said conduit of each of said tubes utilizing said imaging system; and
   directing said laser welder to weld in a circular pattern around each said central point that corresponds to said predetermined diameter of each said flare, therein laser welding each of said tubes to said base plate, creating a gas impervious seal between each of said tubes and said base plate.

10. The method according to claim 9, wherein said step of providing a base plate includes providing a base plate with a plurality of holes at least as dense as ten holes per square centimeter.

* * * * *